United States Patent Office 3,108,086
Patented Oct. 22, 1963

3,108,086
FUEL-RESISTANT PRESSURE-SENSITIVE
COMPOSITION
Robert A. Russell, Northford, and John J. McCarthy, New Haven, Conn., assignors to The Connecticut Hard Rubber Company, New Haven, Conn., a corporation of Connecticut
No Drawing. Filed June 28, 1960, Ser. No. 39,210
2 Claims. (Cl. 260—31.6)

The present invention relates to a novel pressure-sensitive adhesive composition particularly having the characteristics of high resistance to hydrocarbon solvents. The invention also relates to pressure-sensitive adhesive tapes containing such a composition for highly specialized applications where such tapes are likely to be exposed to hydrocarbon solvents such as jet engine fuels.

Superior heat and chemically resistant pressure-sensitive tapes are known and have been widely used in the past. Exemplary of a highly successful type of pressure-sensitive adhesive tape having high temperature and chemical resistance is the fluorinated base silicone rubber pressure-sensitive tape described and claimed in the patent to Henry N. Homeyer et al., No. 2,824,026, assigned to The Connecticut Hard Rubber Company. Although possessing superior characteristics for application where adhesive tapes are subject to exposure to corrosive chemicals and extreme temperature conditions, these tapes do not resist immersion in various hydrocarbon fuels and fluids for extended periods of time at varying temperatures. It is accordingly a primary object of the present invention to provide (1) pressure-sensitive adhesive compositions possessing a superior degree of resistance to hydrocarbon solvents, and (2) adhesive tapes having such fuel resistant pressure-sensitive adhesive compositions firmly bonded to the base material which is preferably a fluorinated polyethylene such as polytetrafluoroethylene and polytrifluorochloroethylene.

Various procedures are known and used for the treatment of fluorinated plastics to improve their wettability and to render them more readily bondable to other surfaces by means of adhesive, heat pressure and similar procedures.

One such method contemplates the formation of a porous surface through the incorporation of metal powder into the resinous body during fabrication. Another method is the so-called sodium etch procedure described in U.S. Patent 2,789,063. The method described in U.S. Patent 2,809,130, which treats the resinous surface with a polyaryl hydrocarbon sodium dispersion, is a further method of priming fluorinated polyethylenes.

In accordance with the procedure described in copending application by one of the present applicants, fluorinated polyethylene plastic base materials are advantageously primed through the application to the surface of the base material of a vinylidene fluoride-hexafluoropropylene polymer to the surface of the fluorinated polyethylene base with the applied priming copolymer referred to. These vinylidene fluoride-hexafluoropropylene polymers possess an exceptionally high degree of resistance to hydrocarbon fuels and are described in British Patent No. 789,786. Mixtures of these polymers with particles of the fluorinated plastic base material and certain fluoroalcohols and condensation products thereof with anhydrides impart superior bonding strength to the primed base of fluorinated polyethylene.

Although the vinylidene fluoride-hexafluoropropylene polymer priming method is preferred in preparing the pressure-sensitive adhesive tapes of the present invention, other available priming methods known to the art may be utilized as will appear hereinafter.

The pressure-sensitive adhesive composition of the present invention comprises a vinylidene fluoride-hexafluoropropylene polymer prepared, for example, in accordance with the teachings of British Patent 789,786. This polymer may be prepared by copolymerizing from 60 to 15 parts by weight of vinylidene fluoride with from 40 to 85 parts by weight of hexafluoropropylene in the presence of a polymerization initiator. The resulting elastomeric composition is a polymer having a molecular weight of from 100,000 to 200,000, for example, and containing from 70 to 30 percent by weight of vinylidene fluoride units and about 30 to 70 percent by weight of hexafluoropropylene units. The resulting product is a gum-like mass having the physical characteristics of coagulated latex.

Various different types of vinylidene fluoride-hexafluoropropylene polymers having slightly different chemical and physical characteristics are available on the market. For example, a product known by the trademark "Viton A," made available by E. I. du Pont de Nemours, Inc., is a polymer of vinylidene fluoride and hexafluoropropylene having a molecular weight of about 100,000. Another product available from the same company, known as "Viton A–HV," has a molecular weight of about 200,000 and characteristics which are similar to Viton A. A similar fluorinated polymer of unknown specific composition and molecular weight is sold under the trademark "Viton B." Such polymers of vinylidene fluoride-hexafluoropropylene are appropriate for the preparation of the improved pressure-sensitive adhesive compositions which are the subject of the present invention.

In accordance with the invention, it has been discovered that improved pressure-sensitive adhesive compositions may be formulated by combining 100 parts of a vinylidene fluoride-hexafluoropropylene polymer, approximately 100 to 500 parts of a fuel resistant plasticizer for the copolymer and approximately 0.5 to 10 parts of a curing agent in an appropriate organic solvent or solvents.

Curing agents found to suitably produce cross-linking with vinylidene fluoride-hexafluoropropylene polymers include polyamines such as triethylene tetramine, peroxides such as benzoyl peroxide and dicumyl peroxide and titanium esters including, for example, tetrabutyl titanate.

Examples of appropriate fuel resistant plasticizers successfully employed in formulating the improved pressure-sensitive adhesive compositions are esters of fluorine containing alcohols with organic acids and condensation products of fluoroalcohols with anhydrides such as Pyromellitate Ester TLT–7, which is an ester of pyromellitic acid with equimolar amounts of 1,1,5-trihydro-octafluoropentanol and 1,1,7-trihydro-dodecafluoroheptanol. Fluoroalkyl Camphorate, consisting of esters of camphoric acid with $H(CF_2CF_2)_xCH_2OH$, where $x=2$, 3, and 4 in a 1:2:1 molar ratio, is also an appropriate plasticizer for the vinylidene fluoride-hexafluoropropylene pressure-sensitive adhesives of the invention.

The novel adhesive compositions are suitably dispersed in organic solvents which include ketones, such as methyl and isobutyl ketone, and alkyl acetates, such as ethyl acetate, for example.

EXAMPLE 1

*Priming of Halogenated Polyethylene Tape*

A priming compound was prepared having the following ingredients:

| | Parts by weight |
|---|---|
| Vinylidene fluoride-hexafluoropropylene polymer | 35 |
| Methyl isobutyl ketone | 65 |

The polymer gum was mixed with the methyl isobutyl ketone to form a dispersion approximating 35% solids by weight. The dispersion was then charged into a DeVilbiss spray gun model JGA-502 and sprayed on the Teflon film.

The film was then introduced into a continuous 30 foot long oven at the rate of 60 yards per hour and heated to a temperature of approximately 750° F. This temperature was found to sufficiently soften or fuse the surface of the Teflon plastic to integrate or interfuse the vinylidene fluoride-hexafluoropropylene polymer coating with the surface of the tape. The film was then allowed to cool to room temperature prior to applying a vinylidene fluoride-hexafluoropropylene polymer prepared in the following manner.

*Preparation of the Pressure-Sensitive Adhesive*

A dispersion was prepared from Viton A, Pyromellitate Ester TLT-7, and triethylene tetramine, dispersed in methyl isobutyl ketone in the proportions shown below. The dispersion was then coated evenly on a primed polytetrafluoroethylene film, .003 inch thick to give a .003 in. dry adhesive layer, then heated to a temperature high enough to volatilize the solvent, but below the activation temperature of the amine vulcanizing agent. The table shows the peel strength obtained when the adhesive tapes thus formed were applied to a stainless steel panel. The laminates formed with these tapes and stainless steel panels were immersed for 24 hours at room temperature in JP-4 jet fuel, or in ASTM Reference Fuel B (70% isooctane, 30% toluene) without appreciable change in the adhesive bond. Under the same conditions, a tape made from polytetrafluoroethylene and a pressure-sensitive mass containing silicone rubber retained none of its adhesive strength after fuel immersion, since its adhesive dissolved in these fuels.

|   | Viton A | Solvent MIBK | Plasticizer TLT-7 | Curing Agent TETA | Peel Strength (oz./in.) | |
|---|---|---|---|---|---|---|
|   |   |   |   |   | Initial | Cured 24 hrs./300° F. |
| (A) | 100 | 185 | 155 | 2.5 | 12 | 28 |
| (B) | 100 | 185 | 245 | 2.5 | 36 | 44 |
| (C) | 100 | 185 | 185 | 430 | 2.5 | 36 | 52 |

EXAMPLE 2

A polytetrafluoroethylene tape was primed by fusing the surface with a dispersion coating containing equal amounts by weight of an aqueous dispersion of 35% Teflon clear finish resin and a 35% solids concentration of vinylidene fluoride-hexafluoropropylene polymer in methyl isobutyl ketone.

A force of 40 ounces per inch of width was necessary to peel the primed Teflon film from a vinylidene fluoride-hexafluoropropylene polymer rubber vulcanizate when the film was coated with the pressure-sensitive mass B of Example 1.

EXAMPLE 3

A polytetrafluoroethylene tape was primed in accordance with the sodium etch procedure described in U.S. Patent 2,789,063 and provided with an adherent coating of a vinylidene fluoride-hexafluoropropylene polymer having the composition and characteristics of composition C in Example 1 above. A force of 42 ounces per inch of width was necessary to peel the sodium etched Teflon film from a stainless steel panel.

A further specimen of polytetrafluoroethylene film was given a similar priming treatment by the sodium etch method of Patent 2,789,063 and thereafter provided with a coating of silicone rubber pressure-sensitive adhesive in the manner described in Example 1 of the Homeyer et al. patent referred to above.

Both specimens were immersed for 24 hours at room temperature in JP-4 jet fuel in accordance with the procedure described above. After this period, the vinylidene fluoride-hexafluoropropylene polymer coated tape was unchanged in its pressure-sensitive adhesive characteristics. The silicone rubber pressure-sensitive adhesive coating was entirely dissolved away from the other specimen.

EXAMPLE 4

Two specimens of polytetrafluoroethylene tape were primed by treating the surface of the tape with a polyaryl hydrocarbon sodium dispersion in the manner described in U.S. Patent 2,089,130.

One of the specimens was provided with an adherent pressure-sensitive adhesive coating of vinylidene fluoride-hexafluoropropylene polymer of type B described in Example 1 above.

When given the 24 hour fuel test results were obtained similar to those set forth in the preceding example, namely, the vinylidene fluoride-hexafluoropropylene specimen was unaffected and retained its pressure-sensitive adhesive characteristics, while the pressure-sensitive adhesive coating of the other sample was substantially depreciated.

What we claim is:

1. A pressure-sensitive adhesive composition comprising about 100 parts by weight of a vinylidene fluoride-hexafluoropropylene polymer plasticized with about 100 to 500 parts of a pyromellitic coester with 1,1,5-trihydrooctafluoropentanol and 1,1,7-trihydro-dodecafluoroheptanol, about 0.5 to 10 parts of a curing agent and an organic solvent for the mixture.

2. A pressure-sensitive adhesive composition comprising about 100 parts by weight of a vinylidene fluoride-hexafluoropropylene polymer plasticized with about 100 to 500 parts of a fluoroalkyl camphorate ester of camphoric acid, about 0.5 to 10 parts of a curing agent and an organic solvent for the mixture.

References Cited in the file of this patent

UNITED STATES PATENTS

| 2,549,935 | Sauer | Apr. 24, 1951 |
| 2,824,026 | Homeyer et al. | Feb. 18, 1958 |
| 3,030,260 | Metzler et al. | Apr. 17, 1962 |

FOREIGN PATENTS

| 544,906 | Canada | Aug. 13, 1957 |